(No Model.)
H. WHEELER.
SIPHON.
No. 474,889. Patented May 17, 1892.
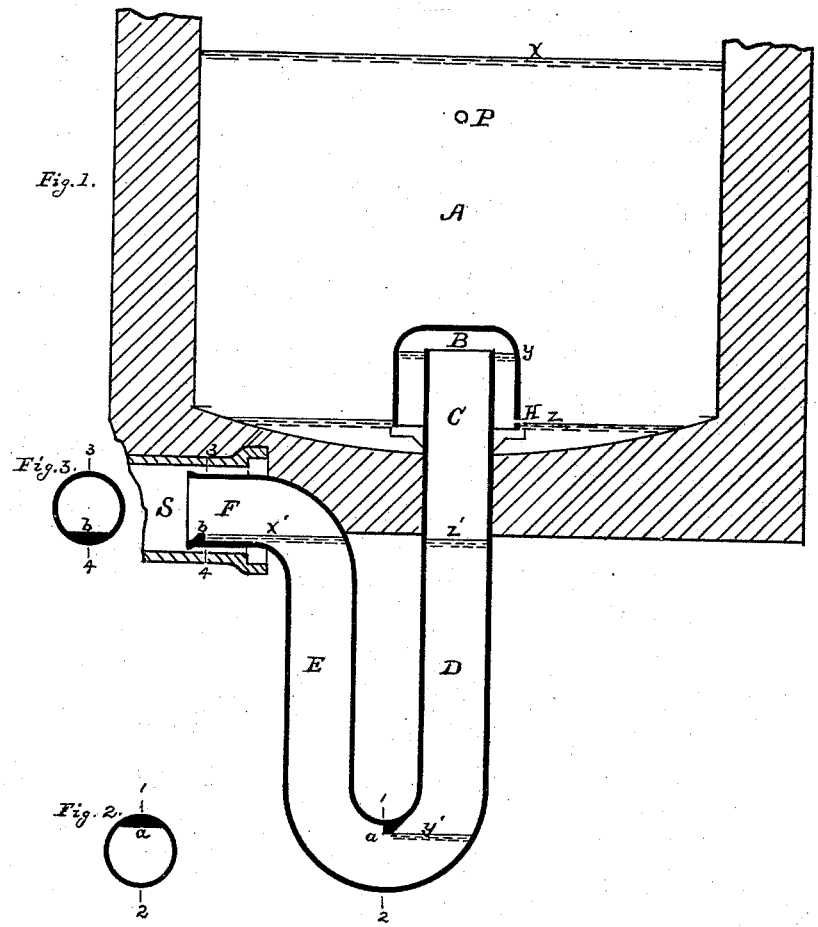
WITNESSES:
W. C. Spangler
W. B. Brownell
INVENTOR
Holland Wheeler

UNITED STATES PATENT OFFICE.

HOLLAND WHEELER, OF LAWRENCE, KANSAS.

SIPHON.

SPECIFICATION forming part of Letters Patent No. 474,889, dated May 17, 1892.

Application filed November 23, 1891. Serial No. 412,884. (No model.)

*To all whom it may concern:*

Be it known that I, HOLLAND WHEELER, a citizen of the United States, residing at the city of Lawrence, in the county of Douglas and State of Kansas, have invented a new and useful Improvement in Siphons, of which the following is a specification.

My invention relates to siphons which are used to discharge intermittent automatic flush-tanks for the purpose of cleansing sewers and water-closets or like purposes.

The object of my invention is to produce a siphon which may be delicately adjusted and which will operate in a positive and reliable manner, either with a rapid or slowly delivered supply of water or other fluid.

Briefly stated, the essential difference in the construction and operation of the siphon of my invention and the siphons heretofore constructed is this: Siphons as heretofore made have been of uniform circular section, which, with a small depth of aperture, form only a small sectional area for the escape of bubbles of air, whereas in my invention the section is changed so as to give a large sectional area with a small depth of aperture for the transposition of air and water in the trap, the air being passed over in the form of a sheet and not in bubbles, and also the aperture made by bubbles passing over under the concave surface of the pipe of circular section is soon constricted and closed by capillary attraction. I use capillary attraction as a potent factor to secure a greater depth of aperture.

Siphons as heretofore constructed are brought into action by the release of compressed air or by the resulting discharge of water, which is heaved or blown up by the escape of bubbles of air, whereas the siphon of my invention is brought into action by transposing a large volume of compressed air in the form of a sheet or wedge from the receiving to the discharge limb of the trap appended to the siphon, and a like volume of water back from the discharge to the receiving-limb of said trap in such a manner that the transposed air severs and cuts off above it a column of water and air in the discharge-limb of the trap of less static pressure than the compressed air within the siphon proper, and by this means the combined air and water are ejected from the discharge-limb of the trap together and the siphon brought into action.

The construction of my improved siphon, with its appurtenances and the manner of its operation, is fully described as follows, reference being had to the accompanying drawings, which form a part of this description.

The same letters designate corresponding parts on the different figures of the drawings, which are to a scale of one inch to one foot.

Figure 1 represents my invention as applied to a sewer flush-tank, and is a vertical section in a plane through the central axis of the pipe forming the siphon and its connections. Figs. 2 and 3 are sections in vertical planes at right angles to said axis on the vertical lines 1 2 and 3 4, respectively.

Referring to Fig. 1, A is the reservoir or basin of the flush-tank, having the supply-pipe P for the admission of water or other fluid.

B is a bell-shaped vessel, forming the receiving-limb of the siphon, supported in position by the brackets on the pipe C, having ample room for the admission of water under its lower edge, and being provided with an aperture H, known as a "sniff-hole."

C is the discharge-limb of the siphon, and in my invention is so constructed as to have the entire periphery of its upper end truly level. The continuation of the discharge-limb C of the siphon is formed into the receiving-limb D, the discharge-limb E of a fluid-trap, and the outlet-pipe F, which connects with the sewer S.

$a$ (shown in section in Figs. 1 and 2) is a dam or weir in the upper surface of the pipe at the lowest bend of the trap, having its entire lower surface exactly level.

$b$ (shown in Figs. 1 and 3) is a weir or section of the outlet-pipe F, which is finished to a level plane across the bottom of the pipe F.

The operation of my invention is as follows: Sufficient water having been placed in the trap D E, its surfaces stand on the planes $x'$ and $z'$ and on a level with the top of the weir $b$. Water is then admitted through the pipe P, and, having filled the basin of the tank to a level with the top of the hole H, the inclosed air is then confined in the siphon B C, and as the water continues to flow the confined air is compressed, and, with the increasing pressure acting on the water in the trap D E, forces it down in the limb D, up in the limb E, and out of the pipe F, over the weir $b$. This action continues until sufficient water has been admitted to force the surface of the water in D from $z'$ down to $y'$, level with or just below the lower surface of $a$, the surface of the water being slightly concave by reason of capillary attraction between it and the interior surface of the pipe. At this instant the capacity of the receiving-limb B having been properly adjusted to confine the required volume of air above the hole H, the surface of the water in the interior of B will have risen to $y$, a plane very nearly to the top surface of the limb C. Immediately following the arrival of the surfaces of the water at $y$ and $y'$ a slight additional pressure breaks away the film of water held by capillary attraction along the entire breadth of $a$, causing a sudden transposition of a considerable volume of air over $a$ into the limb E, and a like volume of water back into D, the volume of air being greater and of more favorable form for the desired action than would have been, except for the advantageous form given the pipe by the weir $a$. The air in its passage under the weir $a$ causes a depression in the surface of the water, and the air which occupies this space beneath and around $a$ forms a connecting-link between the transferred air in E, which now occupies a considerable portion of the cross-section of E and the remaining confined air in D, C, and B, which is forced downward into D by the action of gravitation on the water in A and B. This downward pressure in D, acting by its connection under $a$ upon the transferred air in E, gives it and the water in E above it an increased upward velocity. The water in E, being insufficient to withstand the pressure in A and B by reason of the diminished hydraulic head in E, caused by the air taking the place of water in the lower portion of E, the water and air moving upward in E is discharged over the weir $b$ in the outlet-pipe, the flow being expedited by the advantageous form given the pipe by the weir $b$, as the water would have a more immediate and a greater volume of discharge over the broad level section of weir $b$ when air is forced around the weir $a$ than would be permitted with the narrow concave surface of the pipe without the weir $b$; also, a benefit derived by the use of both the weirs $a$ and $b$ is that by their prominence in the interior of the pipe they intercept the flow of the discharge in such manner as to cause the removal of the rust or other deposits more completely than would be done without their use. Thus the liability of deposits at these points accumulating to such an extent as to deepen the seal of the trap and destroy the proper adjustment of the siphon would be further removed. Contemporaneous with the action above described, the water in A and B by its momentum, which is augmented immediately by its falling in a large volume over the upper level edge of C, develops such force as to carry all of the confined air out of the siphon and bring the siphon into full action, discharging the water in the basin until its surface is brought down to the level at $z$ below the top of the hole H, when sufficient air will be admitted through H to break the siphonage and restore the surface of the water in D and E to their former positions at $z'$ and $x'$, respectively, when the tank and siphon are ready for another filling and discharge.

Having described the construction and operation of my invention, what I claim as my invention, and desire to secure by Letters Patent, is—

1. The combination of the siphon B C, having its receiving-limb properly adjusted for capacity and its discharge-limb level on top, the deep-sealed trap D E, provided with the level weir $a$, and the outlet-pipe F, provided with the level section or weir $b$, constructed and operating as specified.

2. The combination of the trap D E, provided with the weir $a$, and the outlet-pipe F, having level section or weir $b$, constructed and operating as specified.

HOLLAND WHEELER.

Witnesses:
A. C. SPANGLER,
W. B. BROWNELL.